(12) United States Patent
Sakamoto et al.

(10) Patent No.: US 12,037,935 B2
(45) Date of Patent: Jul. 16, 2024

(54) COOLING APPARATUS FOR VEHICLE

(71) Applicants: TOYOTA JIDOSHA KABUSHIKI KAISHA, Toyota (JP); DENSO CORPORATION, Kariya (JP)

(72) Inventors: Daisuke Sakamoto, Miyoshi (JP); Shunsuke Aka, Toyota (JP); Tetsuya Ikeda, Okazaki (JP); Koji Norisada, Kariya (JP); Souta Okabe, Kariya (JP); Etsuko Kamakura, Kariya (JP); Masataka Minamigawa, Kariya (JP); Junichi Suematsu, Kariya (JP); Masashi Shibata, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 653 days.

(21) Appl. No.: 17/272,045

(22) PCT Filed: Aug. 23, 2019

(86) PCT No.: PCT/JP2019/033179
§ 371 (c)(1),
(2) Date: Feb. 26, 2021

(87) PCT Pub. No.: WO2020/045312
PCT Pub. Date: Mar. 5, 2020

(65) Prior Publication Data
US 2021/0348543 A1 Nov. 11, 2021

(30) Foreign Application Priority Data
Aug. 31, 2018 (JP) ................. 2018-163260

(51) Int. Cl.
*F01P 5/02* (2006.01)
*F01P 1/00* (2006.01)
*F28D 1/04* (2006.01)

(52) U.S. Cl.
CPC ........ *F01P 5/02* (2013.01); *F01P 1/00* (2013.01); *F28D 1/0443* (2013.01); *F01P 2005/025* (2013.01); *F01P 2050/24* (2013.01)

(58) Field of Classification Search
CPC ........ F01P 5/02; F01P 5/06; F01P 1/00; F01P 2005/025; F01P 2005/046; F01P 2050/24;
(Continued)

(56) References Cited

U.S. PATENT DOCUMENTS

| | | | |
|---|---|---|---|
| 6,182,744 B1 * | 2/2001 | Nakamura | F28D 1/0417 62/509 |
| 2004/0134204 A1 * | 7/2004 | Honda | B60H 1/3205 62/134 |
| 2005/0217832 A1 * | 10/2005 | Sanada | F28D 1/0452 165/140 |

FOREIGN PATENT DOCUMENTS

| | | | | |
|---|---|---|---|---|
| CN | 1706681 A | * | 12/2005 | ............. F25B 39/04 |
| DE | 102007037626 A1 | * | 4/2008 | ......... B60H 1/00385 |

(Continued)

*Primary Examiner* — Emmanuel E Duke
(74) *Attorney, Agent, or Firm* — Dinsmore & Shohl LLP

(57) ABSTRACT

A cooling apparatus for a vehicle includes air-cooling first and second heat exchangers that are placed beside each other. A coolant flow-out portion of the first heat exchanger from which a first coolant which is a cooling target of the first heat exchanger flows out and a coolant flow-out portion of the second heat exchanger from which a second coolant which is a cooling target of the second heat exchanger flows out are placed at ends at opposite positions separated along a diagonal line on a parallel placement surface of the two heat exchangers. A first cooling fan is placed opposing the coolant flow-out portion of the first heat exchanger, and a (Continued)

second cooling fan is placed opposing the coolant flow-out portion of the second heat exchanger. With this configuration, cooling performance of two air-cooling heat exchangers placed beside each other can be improved.

4 Claims, 3 Drawing Sheets

(58) Field of Classification Search
CPC .......... F01P 2003/185; F01P 2003/187; F01P 2060/14; F01P 3/18; F28D 1/0443; F28D 1/0452; B60K 11/04
See application file for complete search history.

(56) References Cited

FOREIGN PATENT DOCUMENTS

| | | | |
|---|---|---|---|
| DE | 102011006350 A1 | | 10/2012 |
| JP | 2002-107094 A | | 4/2002 |
| JP | 2005-088840 A | | 4/2005 |
| JP | 2005088840 A | * | 4/2005 |
| JP | 2007-326431 A | | 12/2007 |
| JP | 2013015058 A | * | 1/2013 |
| JP | 2014-034323 A | | 2/2014 |
| JP | 2014034323 A | * | 2/2014 |
| JP | 2018075921 A | * | 5/2018 |
| WO | 2008/091238 A2 | | 7/2008 |

* cited by examiner

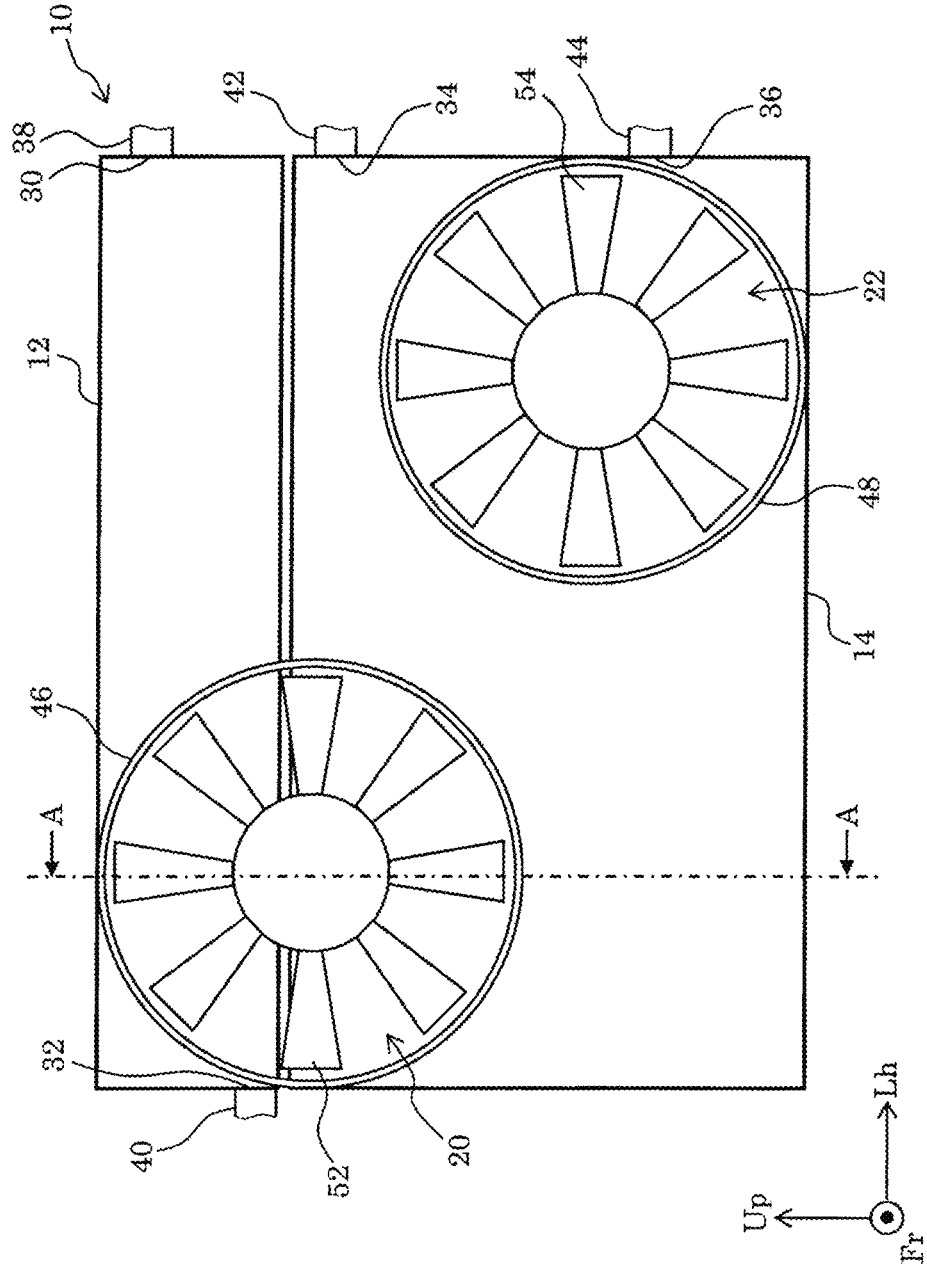

[Fig. 2]
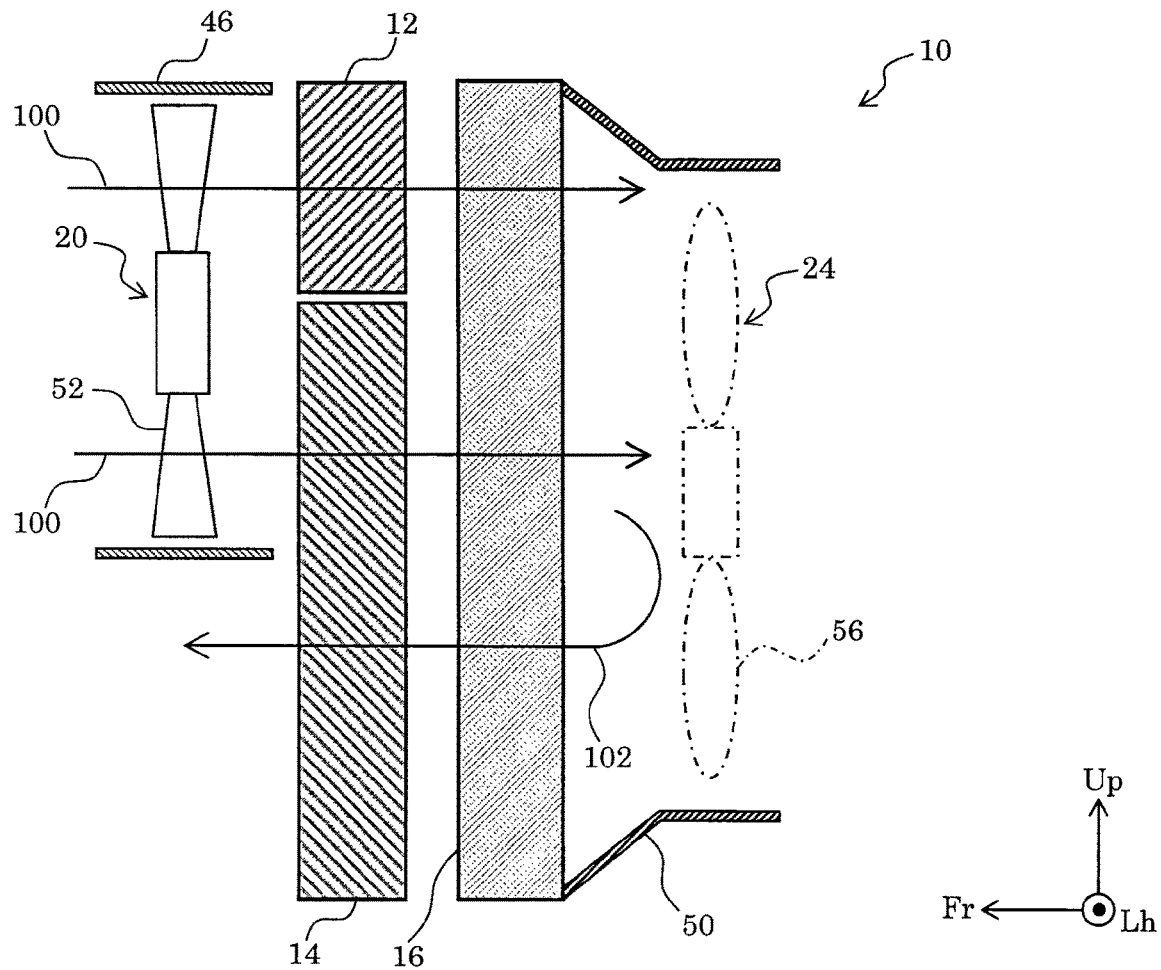

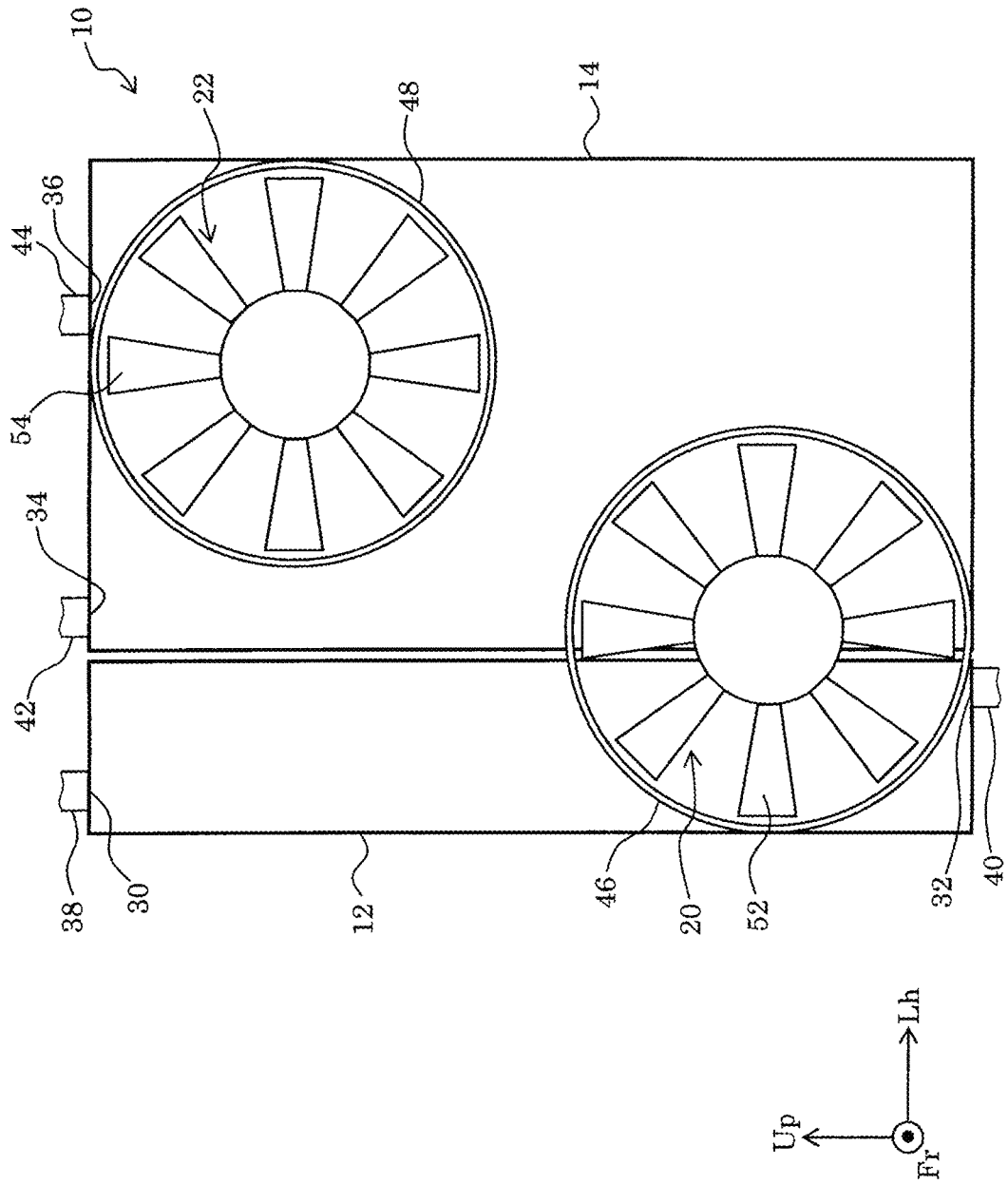
[Fig. 3]

COOLING APPARATUS FOR VEHICLE

CROSS-REFERENCE TO RELATED APPLICATIONS

The present application is the National Phase entry of International Patent Application No. PCT/JP2019/033179 filed on Aug. 23, 2019, which claims priority to Japanese Patent Application No. 2018-163260 filed Aug. 31, 2018, the entire contents of which are hereby incorporated by reference into this application.

TECHNICAL FIELD

The present disclosure relates to a cooling apparatus for a vehicle, and in particular to a structure of a cooling apparatus for a vehicle, in which two air-cooling heat exchangers are placed beside each other.

BACKGROUND ART

A plurality of air-cooling heat exchangers are equipped in a vehicle. For example, a hybrid electric vehicle is equipped with a condenser which cools a coolant which circulates in a refrigeration cycle of an air conditioner, an engine cooling radiator which cools cooling water for the engine, and an inverter cooling radiator which cools cooling water for an inverter which supplies a driving electric power to a motor.

JP 2007-326431 A discloses a structure in which the condenser and the engine cooling radiator are placed beside each other along a front-and-rear direction of the vehicle, at a front part of a vehicle. On a vehicle rear side of the two heat exchangers, two cooling fans of a suctioning type are respectively placed for supplying air to the heat exchangers.

SUMMARY

Technical Problem

In a cooling apparatus for a vehicle in which two air-cooling heat exchangers are placed beside each other, there have not been sufficient reviews for a placement relationship between the heat exchangers and the cooling fans for improving the cooling performance, and there still remains room for improvement.

An aspect of the present disclosure lies in improving a cooling performance of two air-cooling heat exchangers which are placed beside each other in a vehicle body.

Solution to Problem

According to one aspect of the present disclosure, there is provided a cooling apparatus for a vehicle, comprising: a first heat exchanger and a second heat exchanger that are of an air-cooling type and that are placed beside each other along an up-and-down direction of a vehicle or along a left-and-right direction of the vehicle, wherein a coolant flow-out portion of the first heat exchanger from which a first coolant which is a cooling target of the first heat exchanger flows out and a coolant flow-out portion of the second heat exchanger from which a second coolant which is a cooling target of the second heat exchanger flows out are placed at ends on opposite positions separated along a diagonal line on a parallel placement surface of the first and second heat exchangers; a first cooling fan that is placed opposing the coolant flow-out portion of the first heat exchanger; and a second cooling fan that is placed opposing the coolant flow-out portion of the second heat exchanger.

According to this structure, because the two heat exchangers (the first heat exchanger and the second heat exchanger) are placed beside each other along the up-and-down direction or along the left-and-right direction of the vehicle, the cooling air does not pass through one of the heat exchangers and then through the other of the heat exchangers, unlike the case where the two heat exchangers are placed beside each other along the front-and-rear direction of the vehicle. Thus, variation in the cooling performances of the heat exchangers can be suppressed. In addition, because the first cooling fan and the second cooling fan are placed opposing the two heat exchangers at ends on opposite positions separated along the diagonal line on the parallel placement surface of the two heat exchangers, even when the sizes of the two cooling fans are increased, the cooling fans tend to not overlap each other, and cooling air can be sent to a large portion (area) of the two heat exchangers while placing two large-size cooling fans in a manner to oppose the two heat exchangers. Therefore, the cooling performance of the two heat exchangers can be improved. Further, because the cooling fans oppose the coolant flow-out portions of the heat exchangers, respectively, it is possible to suppress warming of the coolant in the heat exchanger which is cooled by the cooling fan, due to a hot reverse air caused by a portion of the sent air of the cooling fan passing through the heat exchanger and returning to the heat exchanger.

According to another aspect of the present disclosure, in the cooling apparatus for the vehicle, the first cooling fan and the second cooling fan do not overlap each other in a front-and-rear direction of the vehicle.

According to this structure, the first cooling fan and the second cooling fan can be arranged beside each other on the same plane, and thus, space in the front-and-rear direction of the vehicle can be saved.

According to the cooling apparatus for the vehicle of the present disclosure, the cooling performance of two air-cooling heat exchangers which are placed beside each other can be improved.

BRIEF DESCRIPTION OF DRAWINGS

FIG. 1 is a diagram schematically showing important portions of a cooling apparatus, viewed from a front side of a vehicle.

FIG. 2 is a cross-sectional diagram along an A-A line in FIG. 1.

FIG. 3 is a diagram schematically showing important portions of a cooling apparatus in another embodiment, viewed from a front side of a vehicle.

DESCRIPTION OF EMBODIMENTS

A cooling apparatus for a vehicle according to an embodiment of the present disclosure will now be described with reference to the drawings. A shape or the like described below are exemplary merely for the purpose of explanation, and may be suitably changed according to the specification or the like of a vehicle and a cooling apparatus. In the following description, the same reference numerals are assigned for similar elements throughout the drawings, and repetitive description will not be given. In the drawings, an arrow Fr shows a vehicle front direction, an arrow Up shows a vehicle upward direction, and an arrow Lh shows a vehicle left direction.

FIG. 1 is a diagram schematically showing important portion of a cooling apparatus 10 for a vehicle, viewed from a front side of the vehicle. FIG. 2 is a cross-sectional diagram along an A-A line of FIG. 1. The cooling apparatus 10 for the vehicle of the present embodiment is equipped in an engine compartment at a front part of a hybrid electric vehicle. In the following, the cooling apparatus 10 for the vehicle will also be referred to simply as a cooling apparatus 10.

The cooling apparatus 10 comprises an inverter cooling radiator 12 which cools cooling water for an inverter which supplies driving electric power to a motor and which receives regenerated electric power from the motor, a condenser 14 which cools a coolant which circulates in a refrigeration cycle of an air conditioner, an engine cooling radiator 16 which cools cooling water for the engine (refer to FIG. 2), two air-pusher type electric fans 20, 22, and one suctioning type mechanical fan 24 (refer to FIG. 2). The inverter cooling radiator 12, the condenser 14, and the engine cooling radiator 16 are air-cooling heat exchangers. The inverter cooling radiator 12 will hereinafter also be referred to as a heat exchanger or a first heat exchanger, the condenser 14 will hereinafter also be referred to as a heat exchanger or a second heat exchanger, and the engine cooling radiator 16 will hereinafter also be referred to as a heat exchanger or a third heat exchanger. The electric fan 20 will hereinafter also be referred to as first cooling fan, and the electric fan 22 will hereinafter also be referred to as a second cooling fan.

The cooling apparatus 10 suctions cooling air from a front grille of the vehicle by rotation of the electric fans 20 and 22 and the mechanical fan 24, and causes the air to contact the heat exchangers 12, 14, and 16 to exchange heat with cooling water and coolant passing therethrough.

The inverter cooling radiator 12 has a rectangular shape with a long side in the left-and-right direction of the vehicle when viewed from the front of the vehicle, and has a predetermined thickness in the front-and-rear direction of the vehicle. On the radiator 12, a cooling water flow-in portion 30 (coolant flow-in portion) is placed at an upper part of an end surface on a left side of the vehicle (right side of FIG. 1), and a cooling water flow-out portion 32 (coolant flow-out portion) is placed at a lower part of an end surface on a right side of the vehicle (left side of FIG. 1). To the cooling water flow-in portion 30 and the cooling water flow-out portion 32, pipes 38 and 40 are respectively connected. Hot cooling water (first coolant) from the inverter side flows through the pipe 38, and flows into the radiator 12 from the cooling water flow-in portion 30. The cooling water flows through and is cooled in the radiator 12, and is then discharged from the cooling water flow-out portion 32. The discharged cooling water flows through the pipe 40 and returns to the inverter side again.

The condenser 14 also has a rectangular shape with a long side in the left-and-right direction of the vehicle when viewed from the front of the vehicle, and has a predetermined thickness in the front-and-rear direction of the vehicle. In the condenser 14, a coolant flow-in portion 34 is placed at an upper part of an end surface on the left side of the vehicle (right side of FIG. 1), and a coolant flow-out portion 36 is placed at a lower part of the same end surface. To the coolant flow-in portion 34 and the coolant flow-out portion 36, pipes 42 and 44 are respectively connected. Hot coolant (second coolant) from a compressor which is a part of the refrigeration cycle flows through the pipe 42 and flows into the condenser 14 from the coolant flow-in portion 34. The coolant flows through and is cooled in the condenser 14, and is then discharged from the coolant flow-out portion 36. The discharged coolant flows through the pipe 44 and to a side of an evaporator.

Although not shown, the engine cooling radiator 16 also has a rectangular shape with a long side in the left-and-right direction of the vehicle, when viewed from the front of the vehicle, and has a predetermined thickness in the front-and-rear direction of the vehicle. The engine cooling radiator 16 has, in a plane in the up-and-down and left-and-right directions of the vehicle, an area in which areas of the inverter cooling radiator 12 and the condenser 14 are added. The engine cooling radiator 16 has a cooling water flow-in portion (not shown) and a cooling water flow-out portion (not shown). Hot cooling water from the engine flows from the cooling water flow-in portion into the radiator 16, flows through and is cooled in the radiator 16, and is then discharged from the cooling water flow-out portion. The discharged cooling water returns to the side of the engine.

The air-pusher type electric fan 20 comprises a rotary wing 52, a rotational shaft (not shown) connected to the rotary wing 52, a motor (not shown) which rotates the rotary wing 52 through the rotational shaft, and a fan casing 46 provided on an outer circumferential side of the rotary wing 52. Similarly, the air-pusher type electric fan 22 comprises a rotary wing 54, a rotational shaft (not shown) connected to the rotary wing 54, a motor (not shown) which rotates the rotary wing 54 through the rotational shaft, and a fan casing 48 provided on an outer circumferential side of the rotary wing 54. The suctioning type mechanical fan 24 shown in FIG. 2 is a fan in which a rotary wing 56 rotates by transmission of a driving force of the engine, and comprises the rotary wing 56 and a rotational shaft (not shown) connected to the rotary wing 56.

As shown in FIG. 1, the inverter cooling radiator 12 (first heat exchanger) and the condenser 14 (second heat exchanger) are placed beside each other along the up-and-down direction of the vehicle. The cooling water flow-out portion 32 (coolant flow-out portion) of the first heat exchanger 12 and the coolant flow-out portion 36 of the second heat exchanger 14 are placed at ends at opposite positions separated along a diagonal line on a parallel placement surface of the two heat exchangers 12 and 14. The electric fan 20 (first cooling fan) and the electric fan 22 (second cooling fan) are placed at a vehicle front side of the two heat exchangers 12 and 14. The electric fan 20 is placed opposing the coolant flow-out portion 32 of the first heat exchanger 12, and the electric fan 22 is placed opposing the coolant flow-out portion 36 of the second heat exchanger 14. The electric fan 20 and the electric fan 22 are at identical positions in the front-and-rear direction, and thus, the electric fans 20 and 22 are placed on the same plane.

As shown in FIG. 2, the engine cooling radiator 16 (third heat exchanger) is placed on the vehicle rear side of the first heat exchanger 12 and the second heat exchanger 14. In addition, the mechanical fan 24 is placed at the vehicle rear side of the third heat exchanger 16. A position of the rotational shaft of the mechanical fan 24 in the left-and-right direction of the vehicle is near a center of widths, in the left-and-right direction of the vehicle, of the first heat exchanger 12 and the second heat exchanger 14 shown in FIG. 1. As shown in FIG. 2, a fan shroud 50 is provided on an outer circumferential side of the rotary wing 56 of the mechanical fan 24. The fan shroud 50 is connected to an outer circumferential end on the vehicle rear side of the third heat exchanger 16, and extends in the vehicle rear side to cover the periphery of the mechanical fan 24.

For example, during idling of the vehicle, a rotational rate of the engine is reduced, and the rotational rate of the mechanical fan 24 which rotates by the driving force of the engine is also reduced. In addition, when the vehicle is driven by the motor, the engine is stopped, and thus, the rotation of the mechanical fan 24 is stopped. Even when the rotational rate of such a mechanical fan 24 is low, or when the rotation is stopped, because the cooling apparatus 10 of the present embodiment has the electric fans 20 and 22, the electric fans 20 and 22 can be rotationally driven, so that the cooling performance required for the heat exchangers 12, 14, and 16 can be secured.

Next, an operation of the cooling apparatus 10 of the present embodiment will be described. The cooling apparatus 10 of the present embodiment achieves the following operation and effect, by the placement relationship of the first heat exchanger 12 and the second heat exchanger 14, and the electric fan 20 (first cooling fan) and the second electric fan 22 (second cooling fan), described above.

In the cooling apparatus 10 of the present embodiment, because the first heat exchanger 12 and the second heat exchanger 14 are placed beside each other along the up-and-down direction of the vehicle, the cooling air does not pass through one of the heat exchangers and then through the other heat exchanger, unlike the case where the heat exchangers are placed beside each other along the front-and-rear direction of the vehicle, and variation in the cooling performance of the two heat exchangers 12 and 14 can be suppressed.

Moreover, according to the cooling apparatus 10 of the present embodiment, as shown in FIG. 1, the first cooling fan 20 and the second cooling fan 22 are placed opposing ends at opposite positions separated along the diagonal line on the parallel placement surface of the two heat exchangers 12 and 14. Because of this, even when the sizes of the first and second cooling fans 20 and 22 are increased, the first and second cooling fans 20 and 22 tend to not overlap each other, and the cooling air can be sent to a large portion (area) of the two heat exchangers 12 and 14 by setting the large-size first and second cooling fans 20 and 22 to oppose the heat exchangers 12 and 14. Thus, the cooling performance of the two heat exchangers 12 and 14 can be improved.

Alternatively, a configuration may be considered in which, for example, one of the first and second cooling fans 20 and 22 is placed at the vehicle front side of the heat exchangers 12 and 14, and the other of the first and the second cooling fans 20 and 22 is placed at the vehicle rear side of the heat exchangers 12 and 14. In this case, even when the sizes of the first and second cooling fans 20 and 22 are increased, the problem of overlap of the cooling fans (one fan blocking the other fan) is not caused. However, when the third heat exchanger 16 and the mechanical fan 24 are placed at the vehicle rear side of the heat exchangers 12 and 14 as in the present embodiment, there is no space at the vehicle rear side of the heat exchangers 12 and 14. Thus, it is not possible to place one of the first and second cooling fans 20 and 22 at the vehicle rear side of the heat exchangers. When the third heat exchanger 16 and the mechanical fan 24 are not placed at the vehicle rear side of the heat exchangers 12 and 14, it is possible to place one of the first and second cooling fans 20 and 22 at the vehicle rear side of the heat exchangers. However, in this case also, a thickness, in the front-and-rear direction of the vehicle, of the cooling apparatus 10 (body structure) is increased as compared to the case where both the first and second cooling fans 20 and 22 are placed at the same side of the heat exchangers 12 and 14 (vehicle front side or vehicle rear side). Therefore, it is necessary or desirable to place both the first and second cooling fans 20 and 22 on the same side of the heat exchangers 12 and 14 (vehicle front side or vehicle rear side), as in the present embodiment.

When the rotation of the mechanical fan is stopped, after cooling air 100 moving due to the rotation of the first cooling fan 20 and the second cooling fan 22 (not shown in FIG. 2) passes through the first heat exchange 12 (or the second heat exchanger 14) and the third heat exchanger 16, flow of reverse air 102 may be caused in which a portion of the cooling air returns to the side of the heat exchangers 12, 14, and 16 again, as shown in FIG. 2. The reverse air 102 is air which has passed through the heat exchanger 12 (or 14) and the heat exchanger 16, and is air which has taken in heat of the engine compartment near the mechanical fan 24, and thus, may be very hot. When such reverse air 102 returns to the heat exchangers 12 and 14, the cooling water and the coolant in the heat exchangers 12 and 14 may be warmed by (may receive the heat from) the reverse air 102. However, according to the cooling apparatus 10 of the present embodiment, because the first cooling fan 20 opposes the cooling water flow-out portion 32 (coolant flow-out portion) of the first heat exchanger 12 as shown in FIG. 1, the cooling water (first coolant) in the first heat exchanger 12 cooled by the first cooling fan 20 can be discharged from the first heat exchanger 12 as is, without being warmed by the reverse air 102. Similarly, because the second cooling fan 22 opposes the coolant flow-out portion 36 of the second heat exchanger 14, the coolant (second coolant) in the second heat exchanger 14 cooled by the second cooling fan 22 can be discharged from the second heat exchanger 14 as is, without being warmed by the reverse air 102.

Further, in the cooling apparatus 10 of the present embodiment, as shown in FIG. 2, the fan casing 46 at the outer circumferential side of the rotary wing 52 of the first cooling fan 20 can function as an air-guide plate, to suppress suctioning of the hot reverse air 102 by the first cooling fan 20. Similarly, the fan casing 48 at the outer circumferential side of the rotary wing 54 of the second cooling fan 22 shown in FIG. 1 may function as an air-guide plate, to suppress suctioning of the hot reverse air by the second cooling fan 22. With this structure, the cooling performance of the two heat exchangers 12 and 14 can be further improved.

In addition, in the cooling apparatus 10 of the present embodiment, the first cooling fan 20 and the second cooling fan 22 are placed in an arrangement on the same plane without overlapping in the front-and-rear direction of the vehicle. Therefore, the space in the front-and-rear direction of the vehicle can be saved.

The cooling apparatus 10 of the present embodiment described above has a structure in which the first heat exchanger 12 and the second heat exchanger 14 are placed beside each other along the up-and-down direction of the vehicle. Alternatively, as shown in FIG. 3, there may be employed a structure in which the first heat exchanger 12 and the second heat exchanger 14 are placed beside each other along the left-and-right direction of the vehicle. The cooling apparatus 10 shown in FIG. 3 has a structure in which the cooling apparatus 10 shown in FIG. 1 is rotated 90 degrees counterclockwise. The above-described operation can also be achieved by such a cooling apparatus 10.

Further, the cooling apparatus 10 of the embodiment described above has a structure in which the third heat exchanger 16 and the mechanical fan 24 are provided on the vehicle rear side of the two heat exchangers 12 and 14. However, the third heat exchanger 16 and the mechanical fan 24 are not required structures, and the above-described operation can be achieved even when these structures are not present.

Moreover, the cooling apparatus 10 of the present embodiment described above has a structure in which the two air-pusher type electric fans 20 and 22 are placed on the vehicle front side of the two heat exchangers 12 and 14. Alternatively, in a case where the third heat exchanger 16 and the mechanical fan 24 are not present, two suctioning type electric fans 20 and 22 may be placed at the vehicle rear side of the two heat exchangers 12 and 14.

REFERENCE SIGNS LIST

10 Cooling apparatus (cooling apparatus for vehicle)
12 Radiator (heat exchanger, first heat exchanger)
14 Condenser (heat exchanger, second heat exchanger)
16 Radiator (heat exchanger, third heat exchanger)
20 Electric fan (first cooling fan)
22 Electric fan (second cooling fan)
24 Mechanical fan
30 Cooling water flow-in portion (coolant flow-in portion)
32 Cooling water flow-out portion (coolant flow-out portion)
34 Coolant flow-in portion
36 Coolant flow-out portion
38, 40, 42, 44 Pipe
46, 48 Fan casing
50 Fan shroud
52, 54, 56 Rotary wing
100 Cooling air
102 Reverse air

The invention claimed is:

1. A cooling apparatus for a vehicle, comprising:
a first heat exchanger and a second heat exchanger of an air-cooling type, that are placed beside each other along an up-and-down direction of a vehicle or along a left-and-right direction of the vehicle, wherein a coolant flow-out portion of the first heat exchanger from which a first coolant which is a cooling target of the first heat exchanger flows out and a coolant flow-out portion of the second heat exchanger from which a second coolant which is a cooling target of the second heat exchanger flows out are placed at ends at opposite positions separated along a diagonal line on a parallel placement surface of the first heat exchanger and the second heat exchanger;
a first cooling fan that is placed opposing the coolant flow-out portion of the first heat exchanger;
a second cooling fan that is placed opposing the coolant flow-out portion of the second heat exchanger;
a third heat exchanger placed beside the first heat exchanger and the second heat exchanger in a front-and-rear direction of the vehicle; and
a mechanical fan provided on a side of the third heat exchanger opposite the first heat exchanger and the second heat exchanger.

2. The cooling apparatus for the vehicle according to claim 1, wherein the first cooling fan and the second cooling fan do not overlap each other in a front-and-rear direction of the vehicle.

3. The cooling apparatus for the vehicle according to claim 1, wherein the first cooling fan and the second cooling fan are provided on a side of the first heat exchanger and the second heat exchanger opposite the third heat exchanger.

4. The cooling apparatus for the vehicle according to claim 1, wherein the mechanical fan overlaps the first heat exchanger and the second heat exchanger in the up-and-down direction of the vehicle when viewed in the left-and-right direction of the vehicle.

* * * * *